United States Patent [19]

Maguire, Jr.

[11] Patent Number: 5,416,666

[45] Date of Patent: May 16, 1995

[54] ERGONOMIC OPERATOR WORKSTATION HAVING MONITOR WITH WING UNIT

[75] Inventor: Justin M. Maguire, Jr., Barrington, R.I.

[73] Assignee: Elsag International N.V., Zuidoost, Netherlands

[21] Appl. No.: 123,624

[22] Filed: Sep. 17, 1993

[51] Int. Cl.⁶ .................. H05K 5/00; A47B 85/00; A47B 97/00

[52] U.S. Cl. .................. 361/681; 361/683; 361/682; 312/223.3; 108/50; 248/918

[58] Field of Search ............ 364/708.1; 248/186, 248/917–923; 174/DIG. 9; 361/681, 682, 683; 312/223.3, 208.1, 7.2; 108/50

[56] References Cited

U.S. PATENT DOCUMENTS 4,515,086  5/1985  Kwiecinski et al. .
4,658,690  4/1987  Aitken et al. .
4,725,106  2/1988  Shields et al. .............. 312/223.3
4,790,647 12/1988  Mann et al. .
4,957,690  9/1990  Fennern ..................... 376/216
5,029,260  7/1991  Rollason .
5,038,169  8/1991  Marincic et al. .
5,120,938  6/1992  Rollason .

Primary Examiner—Michael W. Phillips
Attorney, Agent, or Firm—Vvtas R. Matas

[57] ABSTRACT

A process control operator workstation ergonomically designed to provide a plurality of consoles integrally mountable in a substantially semi-circular configuration wherein the individual operator console provides a variable height keyboard countertop, a video display monitor that is adjustable vertically horizontally and rotationally as well as being tiltable, and an integral rotatable side-panel or monitor wing station mounted to the video display monitor for containing various control modules within easy reach of the operator while viewing the monitor to thus provide a comfortable workstation adaptable to operators in the range of 5% female to 95% male as defined in the anthropometric tables of THE HUMAN FACTORS SOCIETY INC.

10 Claims, 8 Drawing Sheets

|  | 5TH PERCENTILE FEMALE/MALE | 95TH PERCENTILE FEMALE/MALE |
|---|---|---|
| BUTTOCK–KNEE LENGTH | 51.8(20.4)/54.0(21.3) | 62.5(24.6)/64.2(25.3) |
| BUTTOCK–POPLITEAL LENGTH | 40.9(16.1)/45.0(17.1) | 47.2(18.6)/50.5(19.9) |
| ELBOW–FINGERTIP LENGTH | 38.5(15.2)/44.1(17.4) | 46.0(18.1)/51.4(20.2) |
| ELBOW REST HEIGHT (SITTING) | 18.1(7.01)/18.0(7.5) | 28.1(11.0)/29.4(11.6) |
| EYE HEIGHT (SITTING) | 67.5(26.6)/72.6(28.3) | 78.5(30.9)/84.4(33.2) |
| FOOT LENGTH | 22.3(8.8)/24.8(9.8) | 26.2(10.3)/29.0(11.4) |
| HIP BREADTH | 31.2(12.3)/30.8(12.1) | 43.7(17.2)/40.6(16.0) |
| KNEE HEIGHT (SITTING) | 45.2(17.8)/49.3(19.4) | 54.5(21.5)/59.3(23.3) |
| POPLITEAL HEIGHT | 35.5(14.0)/39.2(15.4) | 44.3(17.4)/48.8(19.2) |
| THIGH HEAIGHT (ABOVE SEAT) | 10.6(4.2)/11.4(4.5) | 17.5(6.9)/17.7(7.0) |

Fig.1
(PRIOR ART)

ERGONOMIC OPERATOR WORKSTATION HAVING MONITOR WITH WING UNIT

BACKGROUND OF THE INVENTION

1. Field of the Invention

The present invention relates to process control operator workstations in general and more particularly to such workstations that are ergonomically designed to provide adjustability accommodating a range of human operator dimensions from females in the 5th percentile up to males in the 95th percentile.

2. Description of the Prior Art

The science of ergonomics deals with the design of equipment and tools so as to make the equipment and tools easily used by the human operator without undue fatigue. The ease of such use as well as the minimizing of strain and fatigue involves designing the tool and equipment to maintain proper orientation with the human operator. As is readily apparent, the "human operator" is a extremely variable entity and different individuals have varying height, reach, angular movement, and differ in various other dimensions all of which must be considered in the proper design of the equipment that the operator will use or interface. This variation of human operators has been outlined in tables created by THE HUMAN FACTORS SOCIETY INC. which variations are summarized in the table of FIG. 1. In this particular table, various anthropometric data are provided which represents the U.S. civilian body dimension for ages 20 to 60 years as determined by J. T. McConville of Yellow Springs, Ohio in his *Anthropology Research Project* and by K. W. Kennedy in his USAF-AMRL-HEG paper presented in 1985. The later paper is based on military data excerpted from the McConville Research Project of 1978.

Turning specifically to operator workstations and their consoles of the type used in process control rooms, the application of ergonomic design consisted, for the most part, of an attempt to provide compatibility of the console with an operator of normal or average anthropometric values. Adjustability of the video display screens consisted usually of making the screen tiltable to provide a good orientation of the video screen to the face of the operator. The dimensioning of the operator's height with respect to the console retaining the screen, for the most part, consisted of a chair being vertically and rotationally adjustable. These adjustments, although providing a certain modicum of compatibility of the operator to the workstation, left out certain other key factors dealing with the fatigue of the operator such as proper angle of the legs with respect to the buttocks in the seated position as well as the angular orientation of the wrist with respect to the keyboard.

Another problem in operator workstation interfaces involved the poor or inadequate location of various status displays and actuators that may have to be operator actuated in response to conditions viewed on the monitor screen by the operator while inputting or monitoring process control data. Process control operators may need to react as quickly as possible to certain adverse conditions during start-up and loading of setpoints and data into critically controlled systems such as nuclear reactors or gasoline refineries. An alarm condition has to be quickly if not instantaneously acted upon. Prior art location of such actuators was usually somewhat removed from the video monitor and even when in relatively close proximity thereto, provided a poor viewing angle for the operator preventing him from simultaneously viewing both the monitor and the actuator board.

Thus, the prior art did not meet the needs of the process control industry for a true ergonomically designed operator workstation consisting of consoles that are adjustable to accommodate human operators ranging from the 5th percentile female to the 95th percentile male. Furthermore, process control workstations were needed wherein the actuator keyboard would be in immediate proximity to the video monitor and would be adjustable to provide the simultaneous viewing of both the monitor and the actuator board by the mentioned range of human operators.

SUMMARY OF THE INVENTION

The Applicant's present invention solves all the difficulties of the prior art devices as well as others by providing an ergonomically designed operator workstation adjustable to the range of human operators between the 5th percentile female to the 95th percentile male and which provides a wing console which is adjustable and may be viewed simultaneously by the operator along with the monitor.

To accomplish the foregoing, the Applicant's workstation is configured in a semi-circular orientation with respect to the human operator and provides individual operator consoles that may stand alone or be configured into the mentioned semi-circular orientation with identical consoles or varying other types of consoles such as auxiliary equipment bays, tables for storage, printers, alarms etc. to provide an ergonomically designed workstation.

The console of the present invention involves an ergonomically designed console for holding a video monitor thereon in a plurality of locations. The monitor is vertically adjustable as well as being tiltable and rotatable to accommodate the operator range mentioned. The work surface containing the keyboard is similarly vertically adjustable to provide a comfortable fit to the mentioned range of human operators. Similarly, the console has a slant back design to provide comfortable leg space for the operator as well as a comfortable foot stand.

A wing station is mounted along the side of the monitor and is rotatable with respect to the monitor. The wing station contains annunciators consisting of various process output indications, alarm signals and actuators that the operator may actuate in response to certain alarm conditions. The wing station also contains Liquid Crystal Displays (LCDs) that are capable of displaying additional information such as help menus, export alarm management information, and detailed process control configuration and performance details. The placement and rotatability of this wing station provides the operator with the ability to view both the monitor and the actuator simultaneously by varying the position of the one with respect to the other to suite his particular needs as well as making the actuators immediately accessible to the operator should actuation be warranted in response to an alarm condition.

In view of the forgoing it will be seen that one aspect of the Applicant's present invention is to provide an ergonomically designed operator workstation consisting of plural ergonomically designed consoles joined together into a semi-circular configuration. Another aspect of the Applicant's present invention is to provide and ergonomically designed operator console having adjustable keyboards and work shelf as well as a horizontally and vertically adjustable monitor.

Yet another aspect of the Applicant's present invention is to provide an operator console wherein the monitor and actuator unit are mounted so as to provide simultaneous viewing by the operator and immediate actuation of any actuators in response to an alarm condition.

These and other aspects of the Applicant's present invention will be more clearly understood from a review of the following description of the Applicant's preferred embodiment when considered in conjunction with the appended drawings.

BRIEF DESCRIPTION OF THE DRAWINGS

FIG. 1 is a anthropometric table of the U.S. population with values ranging from the 5th percentile female to the 95th percentile male.

DESCRIPTION OF THE PREFERRED EMBODIMENT

Turning now to the Applicant's description of his preferred embodiment it will be understood that the mentioned embodiment is being disclosed herein not to limit the Applicant's invention thereto but to provide a description of one way of utilizing the Applicant's invention.

Figure 2:
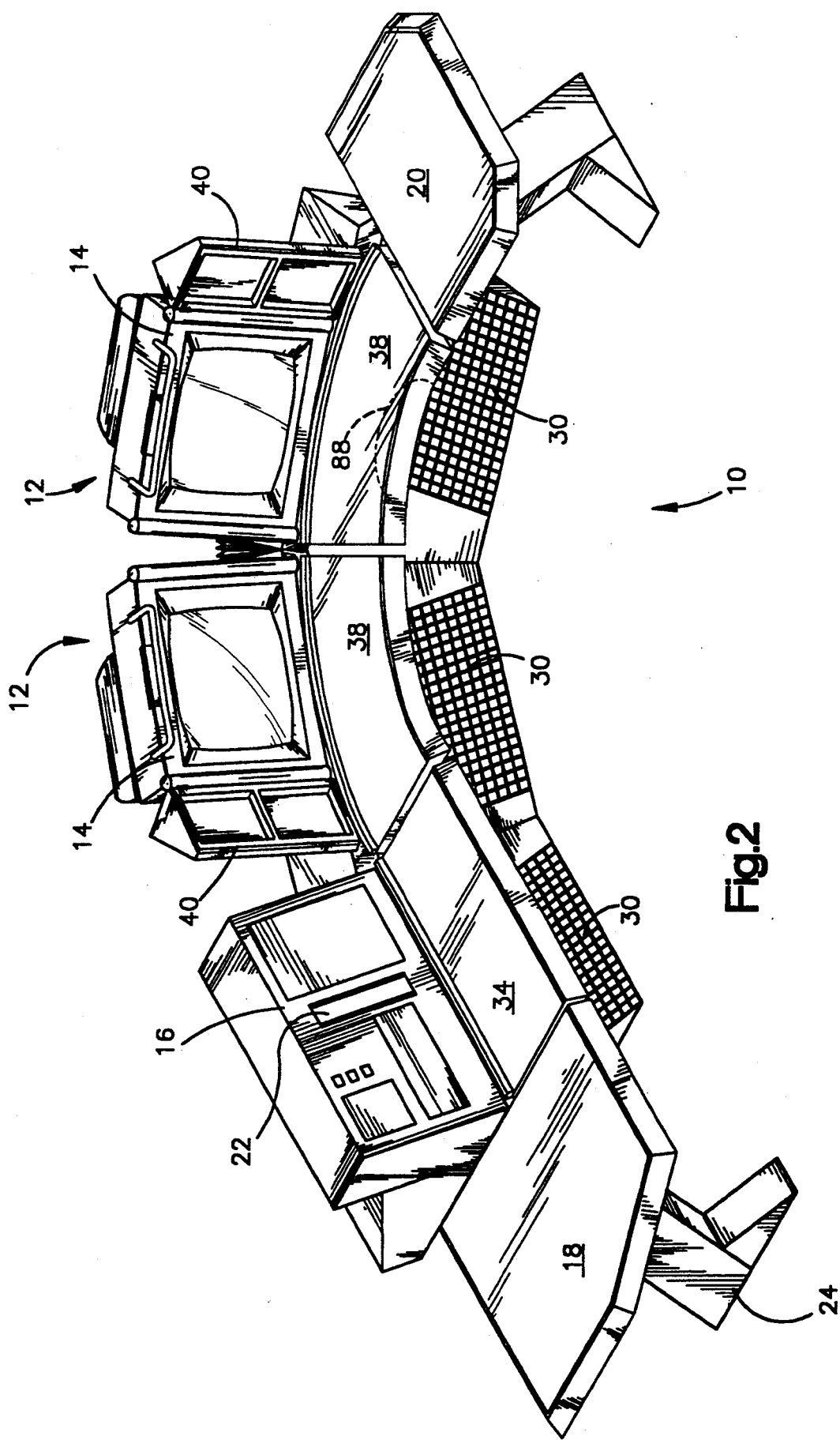
FIG. 2 is an isometric representation of the operator workstation of the Applicant's present invention.
Figure 3:
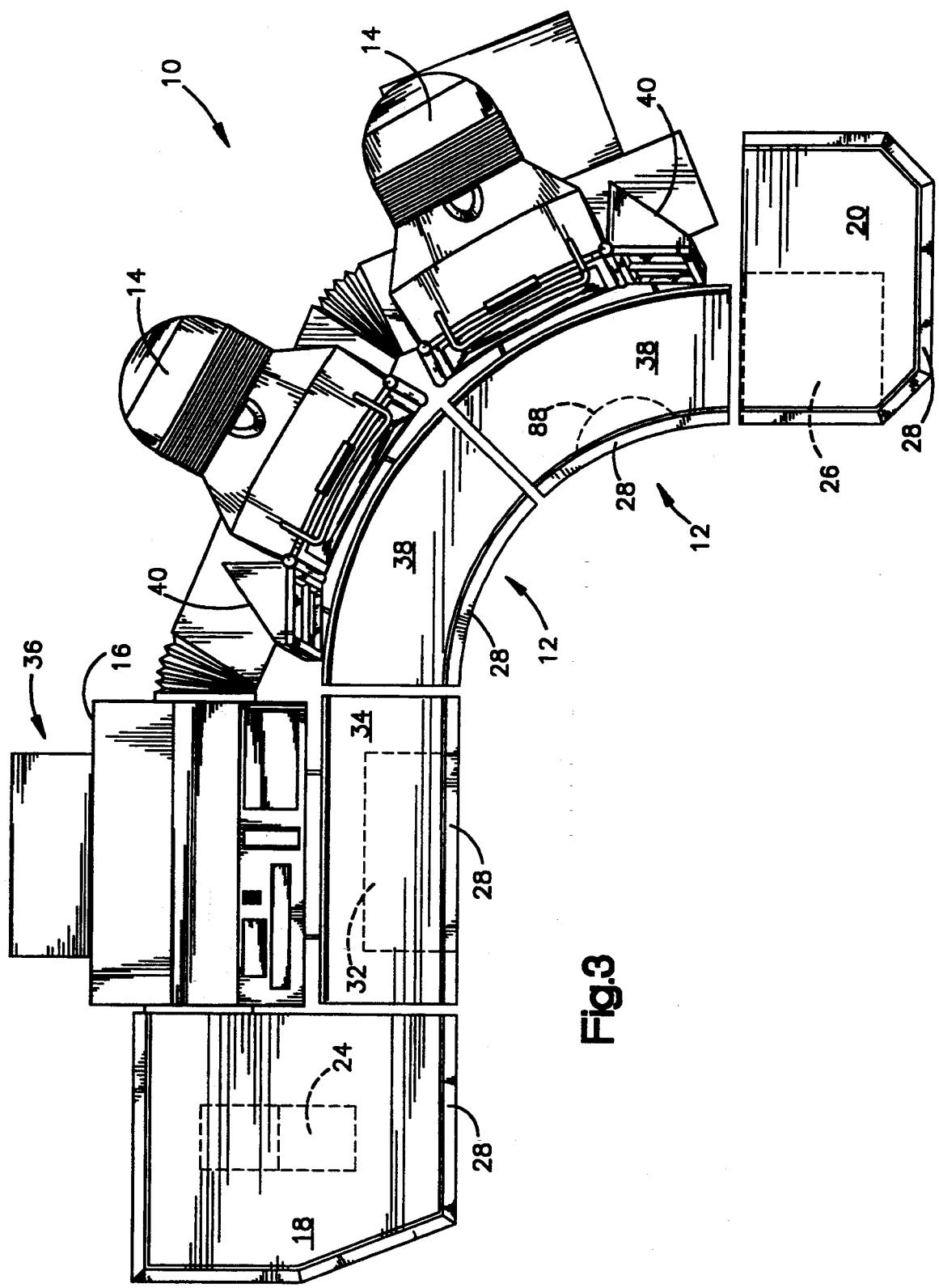
FIG. 3 is a top view of the Applicant's present invention as shown in FIG. 2.

With particular reference to FIGS. 2 and 3, a process control operator workstation (10) is shown which utilizes a pair of ergonomically designed console assemblies (12) along with other consoles all configured into a semi-circular array around the operator (not shown) who is normally seated in front of the video display monitors (VDM) (14) located on the console assembly (12). The other consoles appearing in the semi-circular array include an auxiliary equipment bay (16) mounted proximately to one of the ergonomic console assemblies (12) and a pedestal table (18) along with a drawer table (20) mounted at opposite ends of the semi-circular array.

The auxiliary equipment bay (16) has a phone (22) located thereon along with other equipment such as a two way radio recorders, switches and readout displays all useful to the operator and in close proximity to his position in front of the console (12). As may be best seen with particular reference to FIG. 3, the auxiliary equipment bay (16) also has a keyboard storage drawer (32) located below the work shelf of the auxiliary equipment bay (16) proximate to the operator. An electronics assembly (36) is located in the back of the auxiliary equipment bay (16) for holding all of the interface connections and electronics necessary to power and send signals to and from the auxiliary equipment bay and the control panel and phone located thereon.

The pedestal table (18) is mounted next to the auxiliary equipment bay (16) and is mounted on a rectangular base and leg assembly (24) to allow peripheral access to the table (18).

The drawer table (20) has a drawer (26) mounted on the operator accessible face of the drawer table (20) which drawer is mounted on ball bearings to easily glide in and out of the drawer table (20).

The work surfaces of the operator workstation (10) are all manufactured to have a soft edge (28) to prevent harming the operator as well as a rubber-covered foot rest (30) angled on the bottom of the console assembly (12) and the auxiliary equipment bay (16) to provide a comfortable foot rest surface for the operator.

The work surfaces of the operator workstation (10) are shown as stationary with the exception of the work surfaces (38) found on the console assembly (12) which are vertically alignable with respect to the operator as will be shown later. It will be understood that while these other work surfaces are stationary they could just as easily be made moveable by mechanisms the same or similar to the mechanisms used to vertically align the work surfaces (38) of the console assembly (12).

The operator workstation (10) provides both functionality as well as engineering design which incorporate the most demanding ergonomic standards. The workstation provides ease of usability, process information viewing as well as operator interface which is efficient and can be easily modified to accommodate different human operators.

Figure 4:
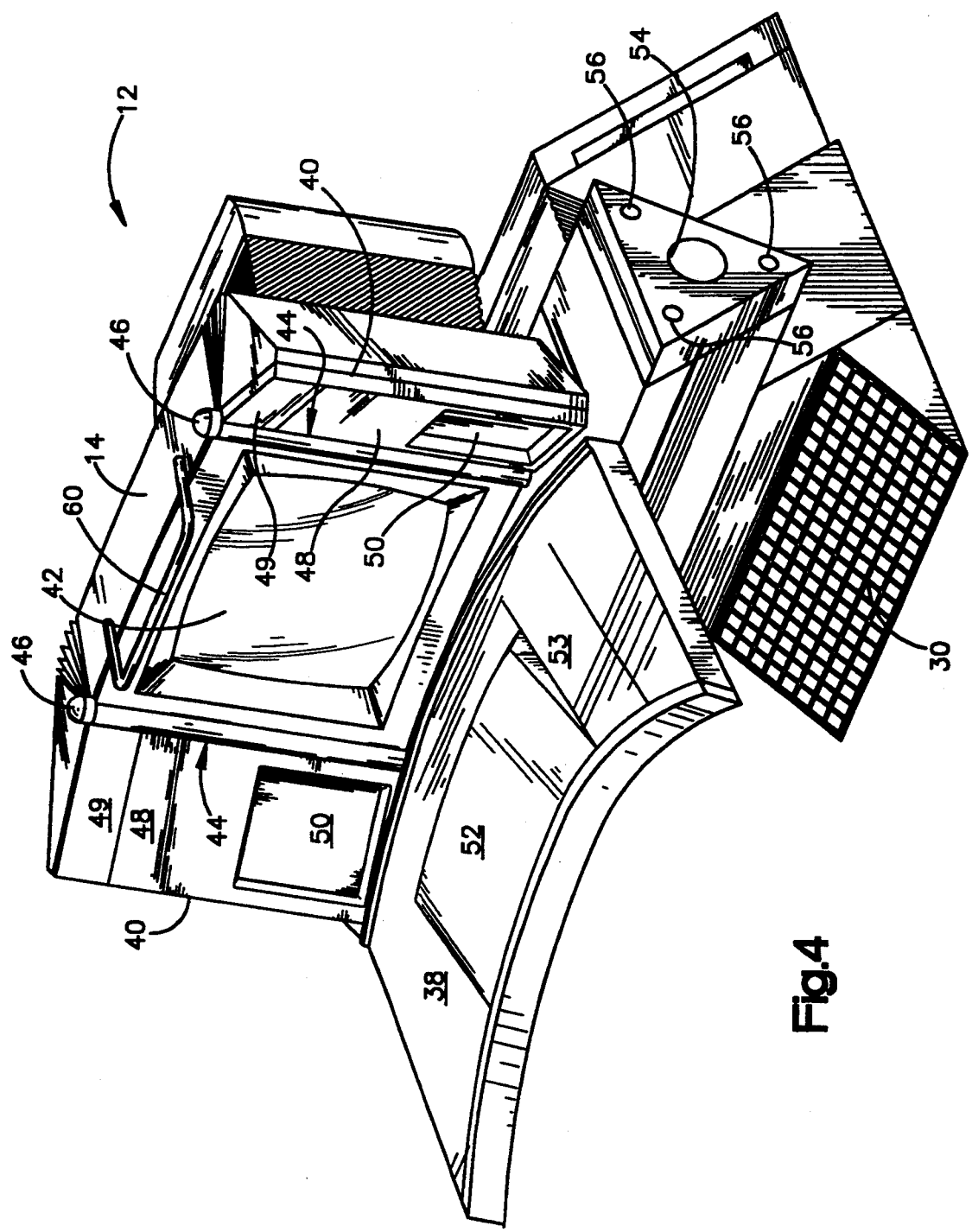
FIG. 4 is an isometric view of the operator console of the present invention as shown in the workstations of FIGS. 2 and 3.
Figure 5:
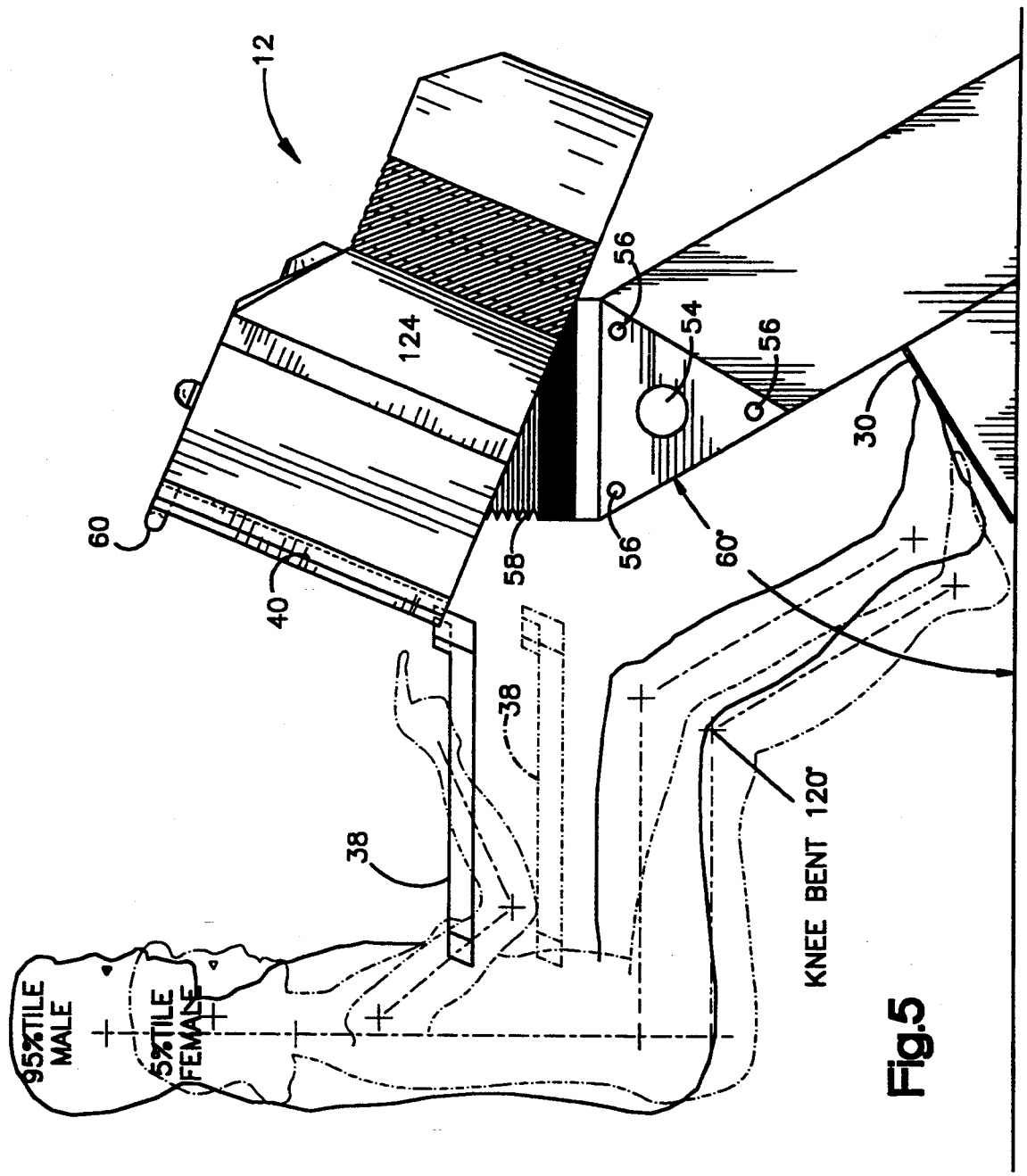
FIG. 5 is a side-view of the console of FIG. 4 shown in adjustable orientation to the range of human operators between the 5th percentile female and the 95th percentile male.

With particular reference to FIGS. 4 and 5 it will be seen that the console assembly (12) of the workstation (10) has a wing station (40) vertically mounted either singularly or in pairs at opposite ends of the screen (42) of the VDM monitor (14). Each wing station (40) is rotatably mounted to the monitor (14) by way of a pivot assembly (44) comprising a pin mounted to one unit and a hinge to the other unit to pivotally connect the wing station unit (40) to the monitor unit (14) in a well known manner. A known interference type fit threaded lock (46) captures the desired rotatable location of the wing station (40) to the monitor (14) once a proper rotational alignment has been made by the operator between himself and the wing stations (40) with respect to the operator's view of the screen (42) of the monitor (14). Each wing station (40) has a logo area (48) onto which certain manufacturer legends or logos as well as operator instructions may be printed. Additionally, each wing unit (40) has a Liquid Crystal Display (49) as well as an annunciator unit (50) located therein with the display and control panel (50) of the annunciator unit being found on the face of the annunciator (50). Typical annunciator units comprise a self-contained assembly or case having point cards, light boxes, flasher cards, push buttons, audible devices and a power supply all contained therein. Typical annunciator assemblies are annunciators such as the Series 90 ANNUCIATOR SYSTEMS available from Panalarm Company of Skokie, Ill.

These annunciator systems give the operator a clear on-line indication of the condition of the monitored system. Clearly, it will be understood that the operator in using the console assembly (12) may input set points, programs, data etc. that may affect the process control system being controlled from the workstation (10) in an unexpected manner. Such condition would indicate an alarm or caution and would be clearly viewable to the operator by the properly aligned display of the annunciator system (50) located in the properly aligned wing station (40). The operator would then not only be able to quickly and simultaneously view the annunciator system but could immediately react to these alarm or caution conditions by actuating control buttons also found on this system (50). The Liquid Crystal Display (49) is used to display additional information such as alarm management and detailed process control.

The console assembly (12) also has a keyboard (52) and a trackball or mouse (53) located on the work shelf (38) which is vertically alignable. On the side of the console assembly (12) is found a central opening (54) for providing an electrical wireway connecting power and communications wiring between the console assembly (12) and the adjoining consoles of the workstation (10). A series of threaded bolt retainer holes (56) are found for fixedly connecting the console assembly (12) to any adjoining assemblies.

Figure 6:
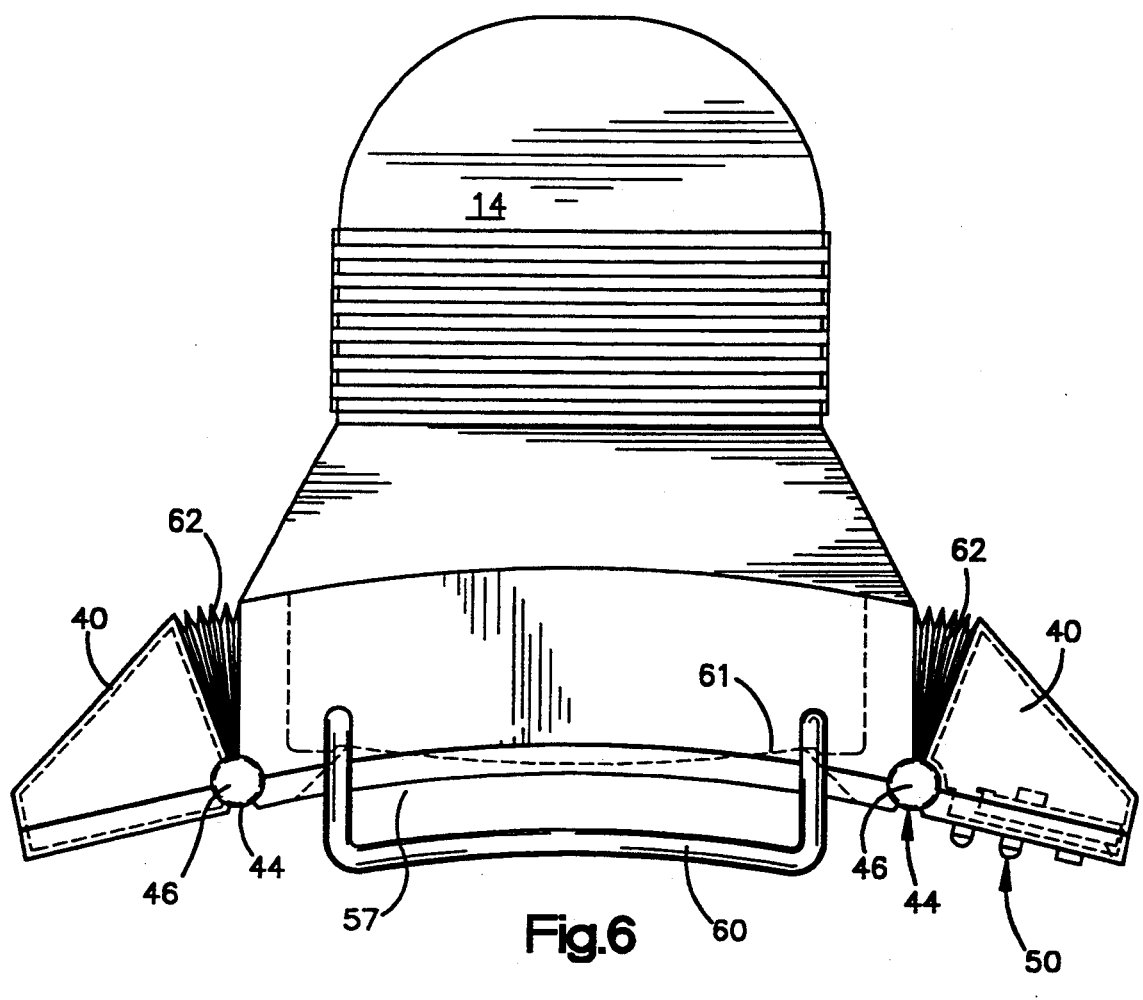
FIG. 6 is a top view of the video display monitor as shown in FIGS. 2, 3, 4 and 5 showing the rotatable orientation of wing stations with respect to the video display monitor.

As may be best seen with particular reference to FIG. 5, the VDM (14) is mounted to the console assembly (12) by way of a threaded mounting base (58) which allows the VDM (14) to be rotated up and down to various vertical positions as well as allowing it to tilt forward and back by grasping a handle (60) on the VDM (14) and tilting same to a desired angle. A graphical representation of the 5th percentile female operator as well and the 95th percentile male operator has been included at FIG. 5 to clearly show that with the vertical adjustability of the work surface (38) as well as the tiltability and vertical and rotational orientation of the VDM (14) when coupled with the broad rubber foot rest surface (30) of the console assembly (12), operators falling anywhere within the range of the 5th percentile female to the 95th percentile male can be comfortably accommodated. In addition to the forementioned adjustable features accommodating the mentioned range of human operators it will be seen with particular reference to FIG. 6 that the wing station (40) is rotatable within a 22½ degree angle between the VDM (14) and the wing unit (40) to accommodate the viewing area and reach envelope of the operator which may be limited by his particular field of vision and arm length. The reach envelope is critical in situations where the operator may have to actuate actuators found in the annunciator units to control alarm conditions. The mentioned rotational angle is accommodated by the pivot assembly (44) and by a bellows (62) within which electrical wiring is fed to the annunciator (50) from the electrical passageway (54) and along the inside of the threaded mounting base (58) mounting the VDM (14) to the bellows (62). As will be best seen with reference to FIG. 6, the face (57) of the monitor (14) housing is made to be concave while the normal screen surface is convex, as seen in dotted lines (61). This concave housing feature allows a better orientation of the wing unit (40) to the monitor (14) allowing simultaneous viewing of the screen (61) and the wing unit (40).

Figure 7:
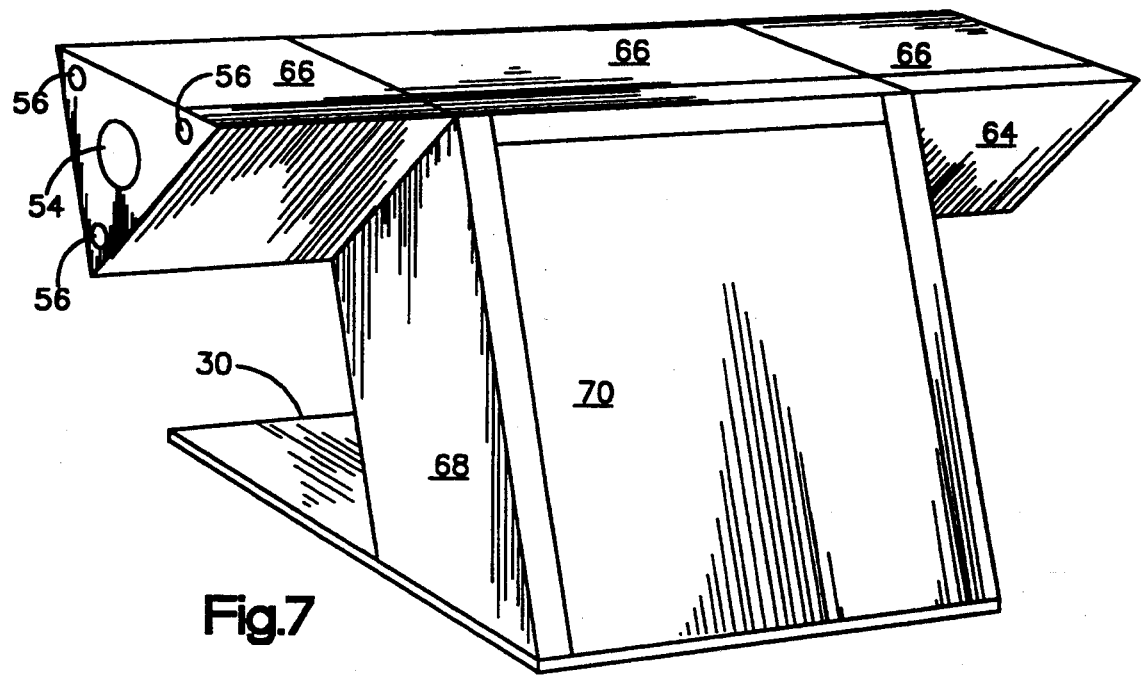
FIG. 7 is an isometric view of the base of the operator console shown in FIGS. 2–5.

Turning next to FIG. 7, the base assembly (64) of the console assembly (12) is seen in its basic form. The triangular top of the base (64) has a series of plate covers (66) which provide access to the base (64) when removed and to the electrical wiring extending through the base (64) by way of the wireway (54). This wireway (54) provides electrical communication amongst the various consoles forming the operator workstation (10). A pedestal (68) raises the console base (64) to the operator's level and by virtue of the pedestal (68) being at an angle of approximately 60° with respect to the console base (64) ample leg room for the operator in the range of the 5th percentile female to the 95th percentile male is provided. As was mentioned earlier, the foot rest (30) extends at an angle from the pedestal (68) and is large enough to accommodate the feet of the previously mentioned operators either higher or lower along the surface of the angled foot rest (30).

Figure 8:
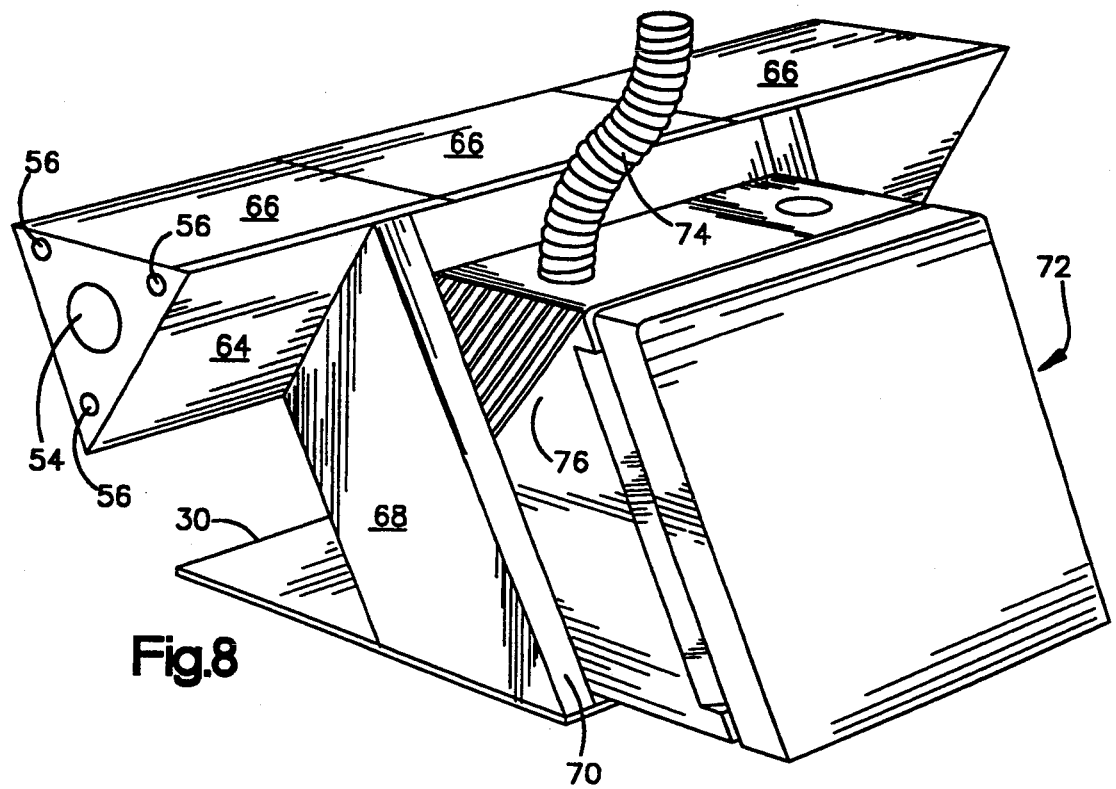
FIG. 8 is a rear view of the base console shown in FIG. 7 having a computer back pack assembly mounted thereto.

Turning next to FIG. 8, it will be seen that the back of the pedestal (68) has a removable plate (70) which when removed provides a mounting area for a computer back pack (72). The computer back pack assembly (72) is a self-contained computer system exclusive of the monitor which has all of the computer's drive discs, hardware and software and provides a way of continuously upgrading and adapting the workstation (10) to different newly developing computer systems by replacing the old with the new or by upgrading same. The computer back pack assembly (72) has an optional umbilical cord (74) for alternately leading all of the computer connections to the monitor (14) as an alternative to; utilizing the internal passageway provided by the threaded mounting base (58). The sides of the computer back pack have vent holes (76) on both sides thereof for cooling the computer located therein.

Figure 9:
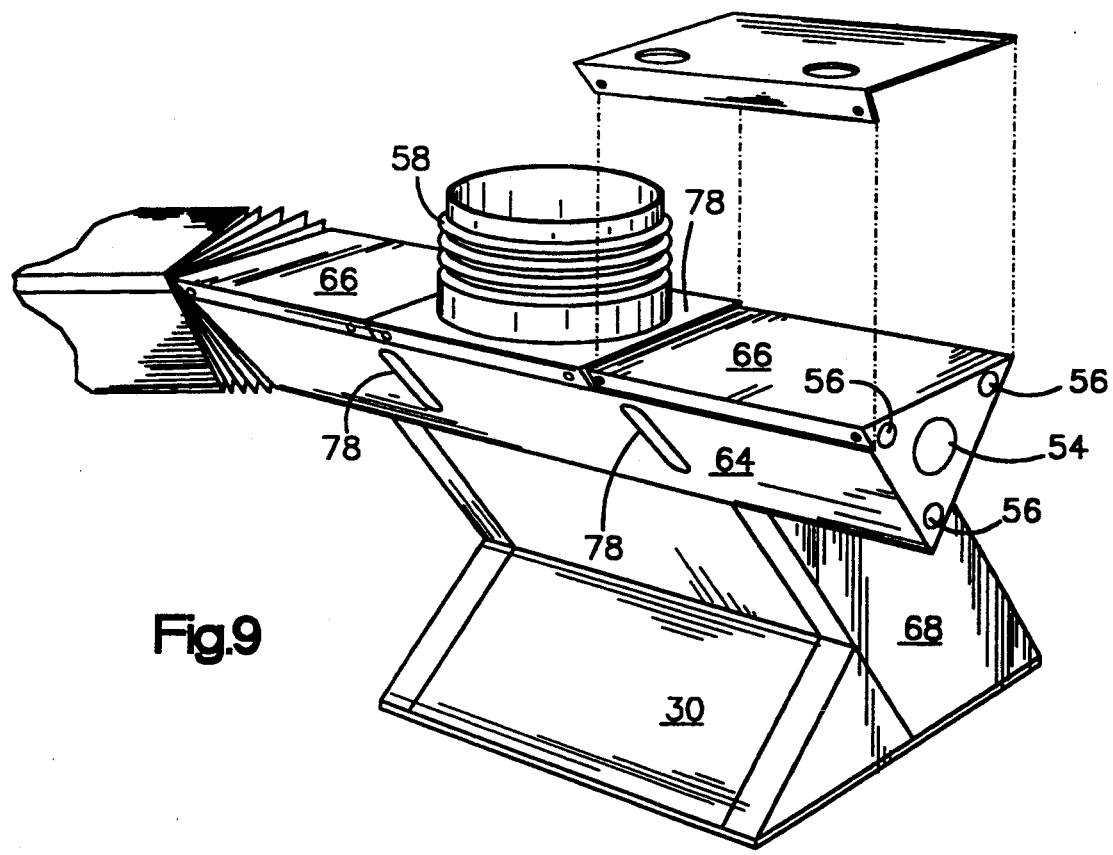
FIG. 9 is a front view of the console base shown in FIGS. 7 and 8 having a video display monitor plate mounted thereto.

As may be best seen with respect to FIG. 9 the covers (66) of the base (64) are interchangeable and also are adaptable to a cover (78) which has the threaded mounting base (58) affixed thereto. The VDM has a complimentary threaded section (not shown) which will thread on the base (58) in a well known manner. Since the threaded mounting base (58) will determine the location of the VDM (14) or monitor on the base (64) of the console (12), it will be seen that the base (64) thus provides for a three-location setup of the VDM (14) on the console (12). The FIG. 9 location shows the VDM (14) in its central mount location. However, as will be seen with specific reference to FIGS. 2 and 3 the VDM (14) may be mounted at the right or left side portions of the base (64). This variation in VDM (14) mountings allows the operator to have plural VDMs clustered around him in close proximity by utilizing two identical console assemblies (12) with one VDM (14) being mounted on the first assembly (12) in the right most portion of the base (64) while the adjoining console assembly (12) has the VDM (14) mounted in the left most portion of the base (64) to provide two adjoining VDM's as seen in FIGS. 2 and 3. In certain situations vertical alignability of the monitor (14) is unnecessary and a well known tilting base assembly for monitors may be used. One such base assembly is available from Ergotron Company of Eagan, Minn.

Figure 10:
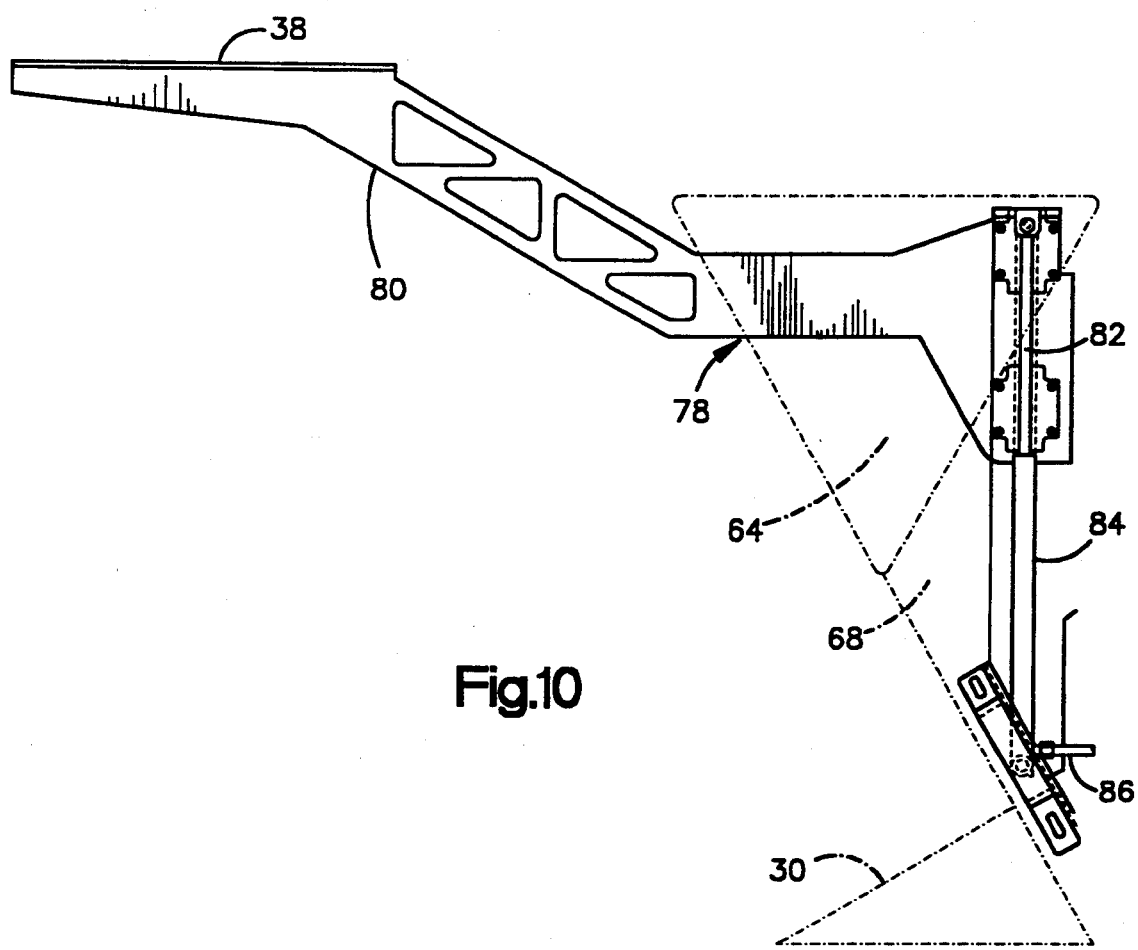
FIG. 10 is a side view of the assembly for vertically moving the work shelf and keyboard mounted thereon on the consoles shown in FIGS. 2–5 and 7–9.
Figure 11:
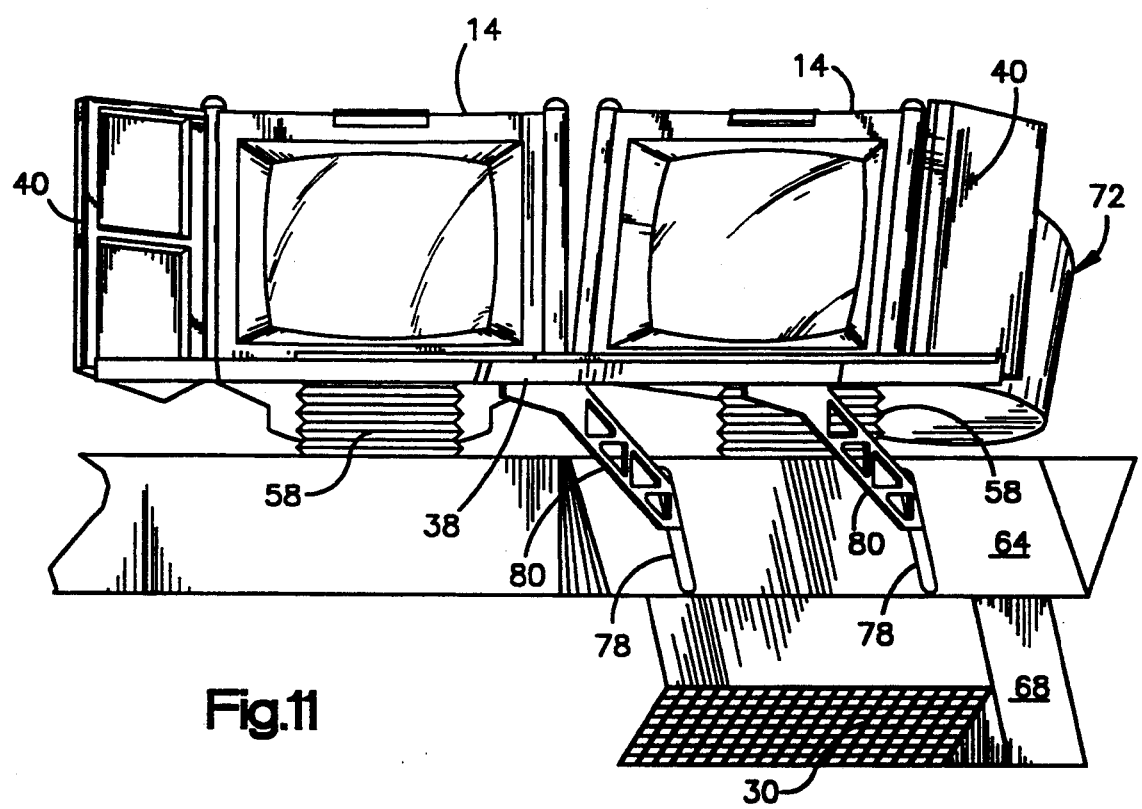
FIG. 11 is a schematic view of the consoles shown is FIGS. 2–4 exhibiting the work shelf adjustment assembly as well as the threaded mounting base for making the video display monitor adjustable.

The front of the base (64) has a pair of spaced slots (78) through which the variable height mounting members of the work shelf (38) may move as will now be described. Turning to FIGS. 10 and 11 it will be seen that the work shelf (38) is mounted to a pair of work shelf support members (80) which extend through the slots (78) in the base (64) of the console assembly (12). The support members (80) terminate internally of the console base (64) to a cross member (not shown) that is affixed to the moveable output shaft (82) of a piston (84). The piston is responsive to the input and exhaust of hydraulic fluid along line (86) to thus extend and retract the shaft (82) with respect to the piston (84) to thus raise and lower the support member (80) and the work shelf mounted thereto. The hydraulics actuating the piston (84) are controlled in a well known manner by an electrical circuit that is actuated by a pair of push buttons (not shown) that may be located on the work shelf (38) itself. One of these push buttons provides electrical power to a source of hydraulic fluid to thus input hydraulic fluid to the piston (84) to thereby elevate the work shelf (38). A second such button opens a vent in the hydraulic line (86) to exhaust hydraulic fluid from the piston (84) and lower the shaft (82) therein to thereby also lower the workstation (38). The actual extension and lowering of the work shelf (38) would be in response to the two push buttons and the response would continue so long as push button was actuated in either of its positions within the limits of travel defined for the worksurface. These limits may be enforced by limit switches oriented to shut power off to the piston assembly whenever they are actuated.

Certain additions and modifications will occur to people skilled in this art area. These additions and modifications have been deleted herein for the sake of conciseness and readability but are considered to be within the scope of the following claims. As an example of such a modification, the worksurface (38) may have to be enlarged when the console assembly (12) is used as a stand alone workstation. In these situations the operator may be to far away from the monitor (14) as well as the wing unit (40). To accommodate this situation, the enlarged surface (38) is formed to have a scalloped cut out section shown as optional Cutout (88) in FIGS. 2 and 3.

I claim:

1. A process control workstation comprising:
   a computer for controlling and monitoring said process;
   a plurality of consoles interconnected to form a substantially semi-circular configuration; at least one of said consoles having a video display monitor and a keyboard for controlling said video display monitor through said computer; and
   a monitor wing station mounted to a side of said monitor and connected to said computer to display process monitoring by said computer.

2. A process control workstation as set forth in claim 1 wherein at least one console includes means for vertically positioning said keyboard.

3. A process control workstation as set forth in claim 2 wherein said positioning means includes a platform containing said keyboard and piston means connected to said platform for vertically moving said platform.

4. A process control workstation as set forth in claim 3 wherein said piston means includes a hydraulic piston having a shaft connected to said platform through mounting means at one end and to the piston at the opposite end with the shaft being vertically movable in response to the supply or venting of hydraulic fluid to the piston.

5. A process control workstation as set forth in claim 1 wherein said wing station is vertically connected by pivoting means including a shaft and hinge respectively mounted to said monitor and said wing station to provide an adjustable arc of approximately 20° with respect to the face of said monitor.

6. A process control workstation as set forth in claim 5 wherein said pivoting means includes locking means for retaining a set orientation of said wing console to said monitor within the substantially 20° arc.

7. A process control workstation as set forth in claim 1 wherein another of said consoles includes an auxiliary bay console connected to said one of the said consoles and having a telephone and a two-way radio mounted thereon.

8. A process control workstation as set forth in claim 1 wherein at least one of said consoles includes a base having removable plates for mounting said monitor in a plurality of horizontal positions.

9. A process control workstation as set forth in claim 8 including a monitor mounting plate having a threaded elastomeric mounting member for locating the monitor thereon in a series of vertical and rotational positions.

10. A process control workstation as set forth in claim 9 wherein said elastomeric member is flexibly alignable to allow tilting of the monitor with respect to said keyboard.

* * * * *